United States Patent
Smith

(10) Patent No.: US 7,590,222 B1
(45) Date of Patent: Sep. 15, 2009

(54) TECHNIQUES AND APPARATUS FOR ONE WAY TRANSMISSION DELAY MEASUREMENT FOR IP PHONE CONNECTIONS

(75) Inventor: Wallace Smith, Sea Girt, NJ (US)

(73) Assignee: AT&T Corp., New York, NY (US)

( * ) Notice: Subject to any disclaimer, the term of this patent is extended or adjusted under 35 U.S.C. 154(b) by 719 days.

(21) Appl. No.: 11/263,141

(22) Filed: Oct. 31, 2005

(51) Int. Cl.
*H04M 1/24* (2006.01)
*H04M 3/08* (2006.01)
*H04M 3/22* (2006.01)

(52) U.S. Cl. .................. 379/31; 379/22.02; 379/23; 379/24; 370/248; 370/252

(58) Field of Classification Search ............ 379/1.01, 379/1.04, 9, 10.02, 10.03, 27.01, 29.01, 10.01, 379/15.01, 22.02, 23, 24, 31; 370/241, 252, 370/253, 352–355, 247, 248, 251
See application file for complete search history.

(56) References Cited

U.S. PATENT DOCUMENTS

| | | | | |
|---|---|---|---|---|
| 6,304,634 B1 * | 10/2001 | Hollier et al. | ............ | 379/22.02 |
| 6,594,344 B2 * | 7/2003 | Masri et al. | ............... | 379/27.01 |
| 6,775,240 B1 * | 8/2004 | Zhang et al. | ................. | 370/251 |
| 2004/0247112 A1 * | 12/2004 | Lee et al. | ..................... | 379/414 |

* cited by examiner

*Primary Examiner*—Binh K Tieu
(74) *Attorney, Agent, or Firm*—Priest & Goldstein, PLLC

(57) ABSTRACT

Techniques for measuring a one way delay between two handsets over an Internet protocol (IP) network utilize a delay measurement subsystem connected to both handsets and a procedure to couple a test signal to both handsets and measure the response to the test signal. The delay measurement subsystem is connected to a call originating handset to play an acoustic test signal to the transmitter of the originating handset. The delay measurement subsystem is connected to a call terminating handset to play the acoustic test signal to the transmitter of the call terminating handset and to record acoustic signals received on the call terminating handset. Signals recorded at the call terminating handset include a sidetone signal and a signal received from the call originating handset. The difference between the sidetone signal and the signal received from the call originating handset represents the delay through the handsets and the IP network.

20 Claims, 4 Drawing Sheets

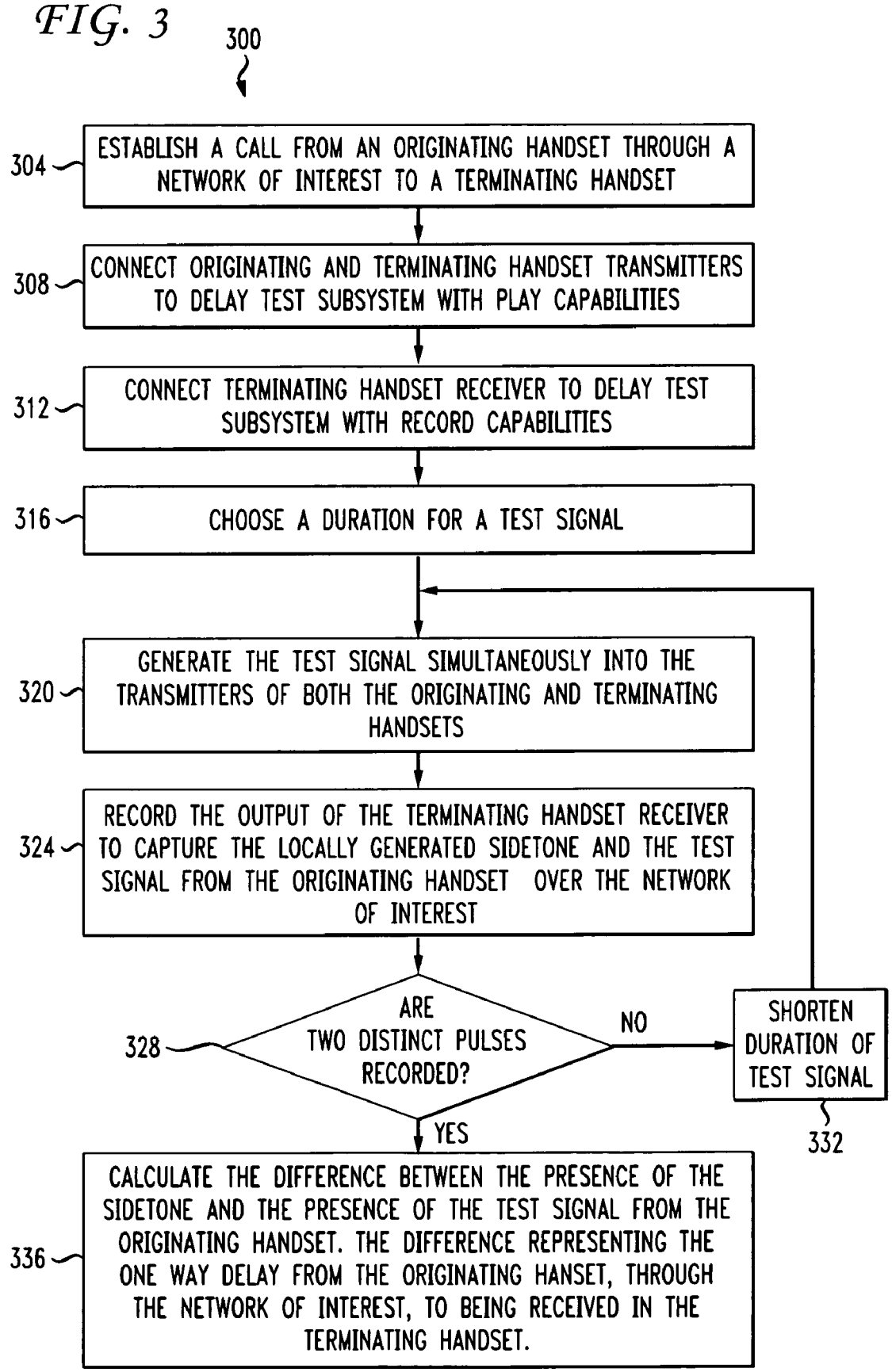

TECHNIQUES AND APPARATUS FOR ONE WAY TRANSMISSION DELAY MEASUREMENT FOR IP PHONE CONNECTIONS

FIELD OF INVENTION

This invention relates generally to measuring one way transmission delay between telephone handsets and, more particularly, to an approach applicable to measuring the one way transmission delay for voice over Internet protocol (VoIP) calls that terminate on Internet protocol (IP) telephones.

BACKGROUND OF INVENTION

Current transmission delay measurements are typically made by injecting a test audio signal into a test connection between a phone and a network used to transport the test audio signal. Such methods assume that the delay introduced by the telephones is quite small. This assumption is not true for voice over Internet protocol (VoIP) calls that terminate on Internet protocol (IP) telephones. Audio signals transported in VoIP networks are coded as a complex IP signal stream. For IP telephones, in order to reproduce the audio signal, the phone must process the received IP signal stream. For example, such processing may include steps to depacketize, decode, and remove jitter from the received IP signal stream. Such processing may introduce significant delay in the transmission path that cannot be ignored or accurately estimated.

SUMMARY OF INVENTION

Among its several aspects, the present invention addresses a technique for measuring the one way delay through a network so that this measure may be used for diagnosing problems, tuning the network, and service characterizations. For such purposes, signals are generated that are used to determine the one way transmission delay for calls connected between handsets through a network. A first electric to acoustic (E/A) converter is coupled to a transmitter of a call originating handset and a second E/A converter is coupled to a transmitter of a call terminating handset. An acoustic to electric (A/E) converter is coupled to a receiver of the call terminating handset. A play/record test apparatus is used for playing a test signal to both the first and second E/A converters and for recording a sidetone locally generated in the call terminating handset and a signal acoustically generated in the call terminating handset based on the test signal played to the first E/A converter and transmitted through the network.

A method of determining the one way transmission delay for a call in accordance with one aspect of the invention begins by establishing a call between two handsets connected over a network. A first acoustic signal is then coupled to the handset originating the call. In synchronism with the coupling of the first acoustic signal, a second acoustic signal is coupled to the handset terminating the call. A sidetone and after a period of delay a third acoustic signal are recorded at the terminating handset for the call, the sidetone in response to the second acoustic signal and the third acoustic signal in response to the first acoustic signal. The one way transmission delay is then measured as the time difference between the start of the sidetone and the start of the third acoustic signal.

A more complete understanding of the present invention, as well as other features and advantages of the invention, will be apparent from the following detailed description and the accompanying drawings.

BRIEF DESCRIPTION OF DRAWINGS

FIG. 3 illustrates a method of determining one way transmission delay for IP phone connections in accordance with the present invention.

DETAILED DESCRIPTION

The present invention will now be described more fully with reference to the accompanying drawings, in which several embodiments and various aspects of the invention are shown. This invention may, however, be embodied in various forms and should not be construed as being limited to the embodiments set forth herein. Rather, these embodiments are provided so that this disclosure will be thorough and complete, and will fully convey the scope of the invention to those skilled in the art.

Figure 1:
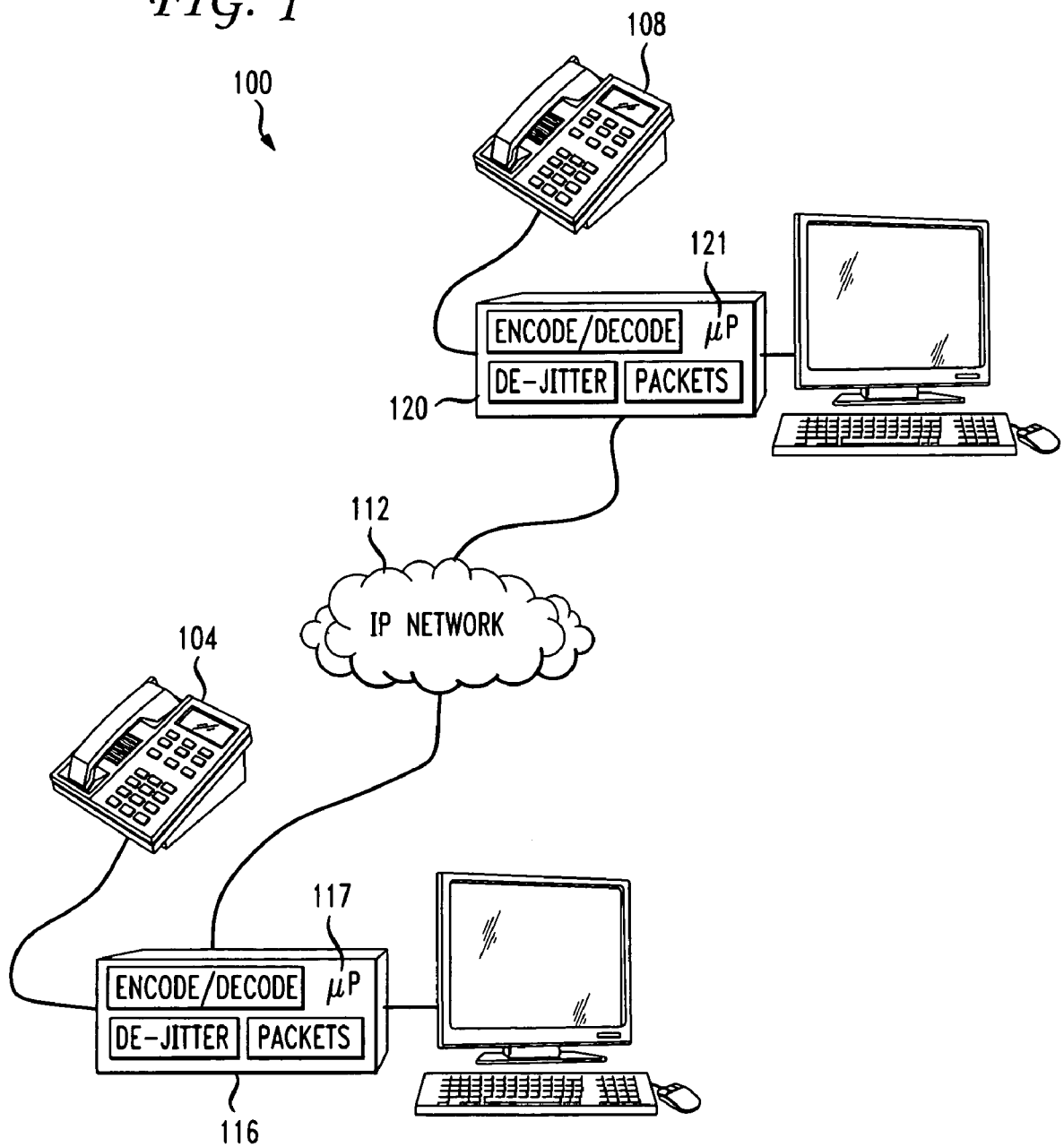
FIG. 1 illustrates a voice over Internet protocol (VoIP) network configuration with two VoIP telephones in accordance with the present invention.

FIG. 1 illustrates a voice over Internet protocol (VoIP) network configuration 100 with two VoIP telephones 104 and 108. The two VoIP telephones 104 and 108 communicate over IP network 112 through a network attachment medium, such as a personal computer 116 or a gateway device 120. The Internet is a packet switched network that has characteristics that are different than the traditional circuit switched voice transmission medium. Internet protocol is a non real time network protocol having varying latencies depending upon a transmission path through the network. For example, the latency may be large if satellite circuits are included in the transmission path. In addition, Internet protocol requires additional processing of an audio signal, for example, to encode the audio signal for compression before transmission and upon reception of the compressed signal to decompress and reproduce the audio signal. Such processing may be accommodated in processors (μP) 117 and 121. In the case of an IP phone, the μP resides in the phone itself. In order to determine a transmission delay of a connection between two telephones, the transmission delay includes the network delay and the delay introduced by the processing of audio signals such as may be incurred by the signal processing in μPs 117 and 121.

Figure 2A:
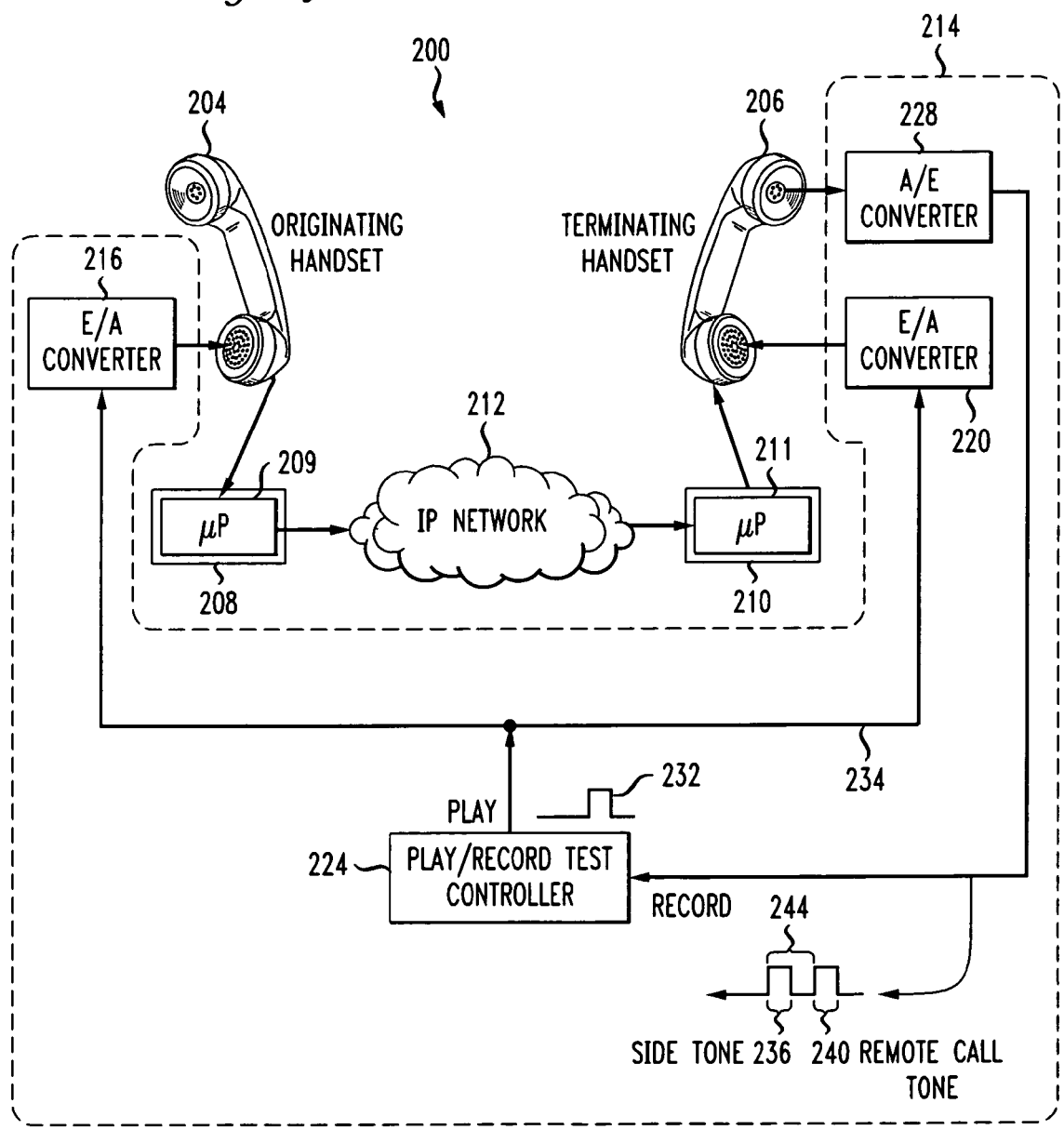
FIG. 2A illustrates a network delay test system having a single test controller in accordance with the present invention.

FIG. 2A illustrates a network delay test system 200 having a single test controller for use in measuring a one way transmission delay between a call originating handset 204 and a call terminating handset 206 connected through attached bases 208 and 210 over an Internet protocol (IP) network 212. The attached bases 208 and 210 may be a VoIP telephone set or a personal computer. When transmitting into the IP network 212, analog to digital conversion, coding, and packetizing typically occur in the attached bases 208 and 210, in processors (μPs) 209 and 211, respectively. When receiving packets from the IP network 212, the attached processors 209 and 211 typically perform buffering, depacketizing, decoding, and digital to analog conversion. Such processing of VoIP signals is a significant contributor to the path delay between the handsets.

Delay measurement subsystem 214 includes an electric to acoustic (E/A) converter 216, an E/A converter 220, a play/record test controller 224, and an acoustic to electric (A/E) converter 228. The play/record test controller 224 is used to inject a short audio test signal 232 into a connection path separate from the IP network 212, for example, a signal cable 234, attached to both E/A converters 216 and 220. The two handsets 204 and 206 and the delay measurement subsystem 214 are located so that the test signal 232 reaches both E/A converters 216 and 220 at approximately the same time, with a tolerance of one millisecond or less, for example. It is appreciated that other delay tolerances may be accounted for depending on the configuration of the network delay test system. The E/A converter 216 converts the test signal 232 into a short acoustic test signal that is received by the call originating handset 204. The call originating handset 204 then begins the transmission process to convert and send the received acoustic test signal to the call terminating handset 206. At approximately the same time, the E/A converter 220 converts the test signal 232 into a short acoustic signal that is received by the terminating handset 206.

Both handsets 204 and 206 generate sidetone signals internal to the handsets from the short acoustic signal they receive. The terminating handset 206 uses the A/E converter 228 to convert the sidetone signal to an electrical pulse 236. The acoustic test signal generated from the originating handset 204 is received in the terminating handset 206 and is converted by the A/E converter 228 to a second pulse 240. The test signal 232 is set for a short duration, where the duration is less than the voice path delay through the IP network 212. An initial test signal 232 duration is chosen, for example, 5 msec which is much shorter than a typical voice path delay, such as, a path delay of 100 msec or greater, that has been observed through the IP network 212. If the initial chosen duration of the test signal 232 is too long, then a shorter duration can be chosen and the test signal 232 applied again.

A handset's transmitter is typically directly coupled to a handset's receiver for producing a sidetone and the delay associated with such coupling is negligible. Since there is negligible delay in producing the sidetone signal in the handsets, the sidetone signal may be used as the starting point for the VoIP network delay measurement. For example, with the play/record test controller 224 sending out a test signal 232, a sidetone 236 is generated followed by receipt of the transmitted test signal 240 after a delay 244. The delay 244 is composed of the delay associated with the signal processing in the handsets 204 and 206, or base 208 processor 209 and base 210 processor 211, and the delay through the IP network 212. The received signals 236 and 240 are recorded in the play/record test controller 224 for analysis. It is noted that by use of the sidetone signal as a reference point, the record operation is independent of the play operation.

Figure 2B:
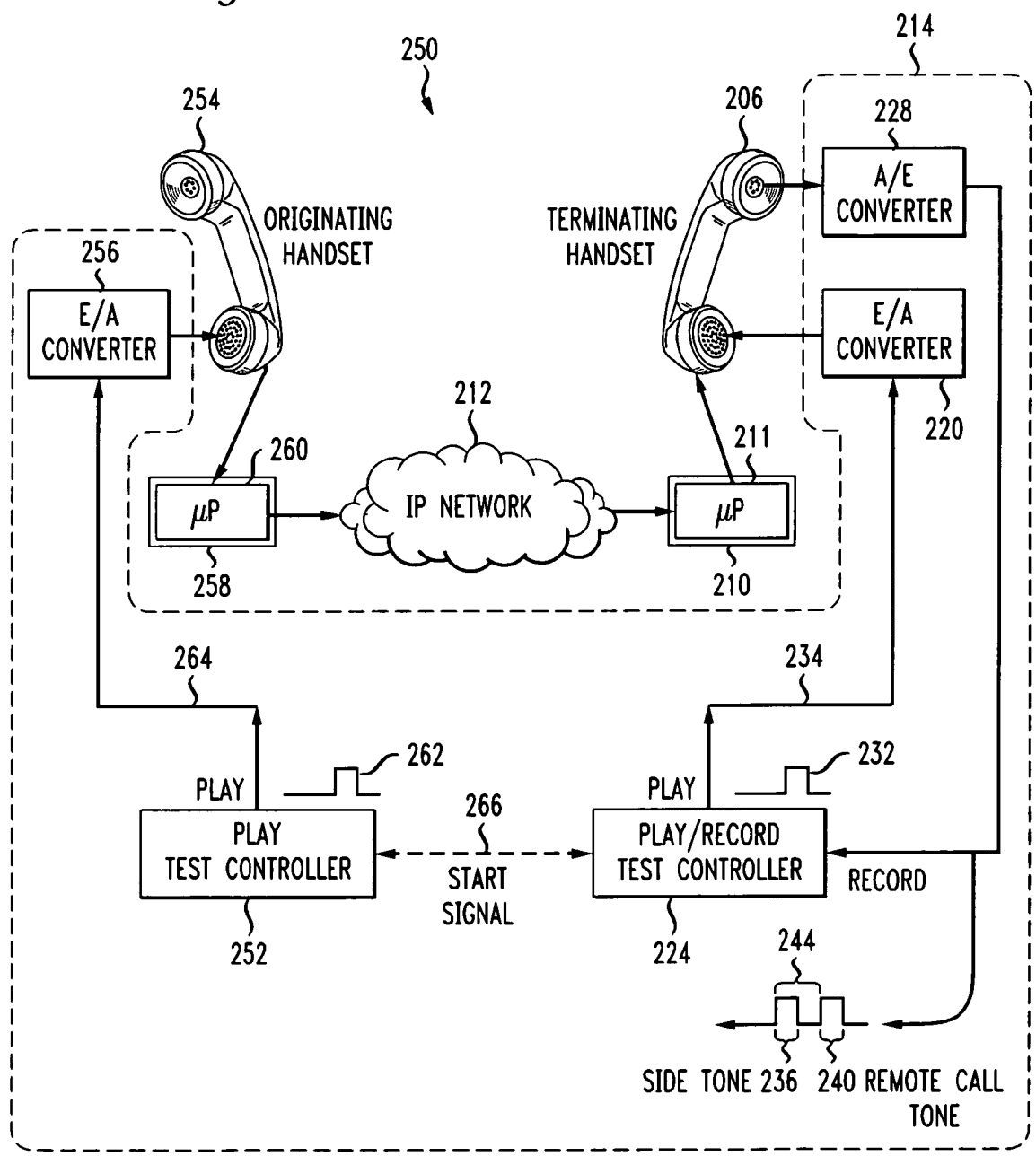
FIG. 2B illustrates a network delay test system having two test controllers in accordance with the present invention.

FIG. 2B illustrates a network delay test system 250 having two test controllers, a play test controller 252 and the play/record test controller 224. The play test controller 252 and play/record test controller 224 may be located at various locations distinct from each other in order to accommodate testing with a remote originating handset 254. The play test controller 252, E/A converter 256, base 258, and processor 260 are located with the remote originating handset 254. The play test controller 252 and the play/record test controller 224 initiate an approximately simultaneous playing of two test pulses, such as test pulses 262 and 232, respectively, within one millisecond delay or less of each other. The pulse 262 follows signal path 264 to the E/A converter 256 and the pulse 232 follows signal path 234 to E/A converter 220. The delay measurement process is followed from this point as previously described with the network delay test system 200.

The initiation of both test controllers 252 and 224 to play a test pulse at approximately the same time is controlled by a start signal 266 that may be a separate signal path or may represent a preprogrammed event that is set to play the test pulses 262 and 232 at a particular time. By using accurate time bases in both test controllers 252 and 224, the playing of the test pulses 262 and 232 may both be started within one millisecond or less of each other. For example, a time base in both test controllers 252 and 224 may be set based on the U.S. atomic clock time signal that is broadcast by the National Institute of Standards and Technology. Both test controllers 252 and 224 are programmed to send out a pulse of the same duration, pulse width, as chosen for the network configuration being measured.

FIG. 3 illustrates a method 300 of determining one way transmission delay for IP phone connections. In a first step 304, a call is established from an originating handset through a network of interest, such as, an Internet protocol (IP) network, to a terminating handset. In step 308, a delay measurement subsystem 214 with play capabilities, such as contained in delay measurement subsystem 214, is connected to the originating and terminating handset transmitters. In step 312, the delay measurement subsystem 214 with record capabilities, such as contained in delay measurement subsystem 214, is connected to the terminating handset receiver. In step 316, a duration for a test signal is chosen. In step 320, the test signal of chosen duration is played simultaneously into the transmitters of both the originating and terminating handsets. In step 324, the output of the terminating handset receiver is recorded to capture the locally generated sidetone and the test signal from the originating handset. In decision step 328, it is determined if two distinct pulses were recorded. In step 332, the duration of the test signal is shortened in response to determining in the decision step 328 that two distinct pulses were not recorded. The method then proceeds to the point of generating the test signal at the start of step 320. In step 336, the time difference between the presence of the sidetone and the presence of the test signal from the originating handset is calculated. The time difference represents the one way delay from the originating handset, through the network of interest, to being received in the terminating handset.

The one way delay through the IP network may be used for diagnosing problems and tuning of the network, as well as, for network and service characterizations. The delay measurement results can be used as a tool in tuning a network by measuring the effect of changing parameter values used by network elements in the call path. For example, packet size and de-jitter buffer size are two parameters used by IP terminating devices that have an effect on the delay through a VoIP connection. This measurement method can be used to measure the delay through a connection after each new setting of these parameters to observe the effect the new settings have on the path delay. The results of applying multiple values of these or other parameters are then used as an aid in determining which settings to use to tune the network for best performance. Also, in many instances, a phone service may have a delay target that must be met for a customer. This delay measurement method would allow the provider of the phone service to test for delay through the call path to ensure that the delay target is met.

While the present invention has been disclosed in a presently preferred context, it will be recognized that the present teachings may be adapted to a variety of contexts consistent with this disclosure and the claims that follow.

For example, the present invention is disclosed mainly in the context of handsets attached to VoIP devices that are connected through an Internet protocol network. It will be appreciated that it may also be employed with other types of handsets, headsets, and networks, such as existing plain old telephone service (POTS) and public switched telephone network. It will also be appreciated that variations in the particular hardware and control process employed are feasible, and to be expected as both evolve with time. For example, an automated procedure may be used to determine the one way delay through a network. Other such modifications and adaptations to suit a particular design application will be apparent to those of ordinary skill in the art.

I claim:

1. An apparatus for generating signals to be used to determine the one way delay for calls connected between handsets through a network comprising:
   a first electric to acoustic (E/A) converter coupled to a transmitter of a call originating handset;
   a second E/A converter coupled to a transmitter of a call terminating handset;
   an acoustic to electric (A/E) converter coupled to a receiver of the call terminating handset; and
   a play/record test controller coupled to the first and second E/A converters for playing a test signal to the call originating handset and the call terminating handset, the play/record test controller coupled to the A/E converter for independently recording a sidetone locally generated in the call terminating handset and a signal acoustically generated in the call terminating handset based on the test signal played to the call originating handset and transmitted through the network.

2. The apparatus of claim 1 wherein the call originating handset and the call terminating handset are voice over Internet protocol (VoIP) phones.

3. The apparatus of claim 1 wherein the test signal is of shorter duration than the voice path delay through the connection network.

4. The apparatus of claim 1 wherein the first E/A converter and the second E/A converter both convert the test signal to acoustic signals that are separately received by the coupled transmitters of the call originating handset and the call terminating handset.

5. The apparatus of claim 1 wherein the A/E converter converts the sidetone and the signal acoustically generated in the call terminating handset to electrical signals.

6. The apparatus of claim 1 wherein the network is an Internet protocol (IP) network.

7. The apparatus of claim 1 wherein the one way delay for calls connected between handsets through a network is determined by measuring the time difference between the recorded sidetone and the signal.

8. A method of determining the one way transmission delay for a call comprising:
   establishing a call over a network between two handsets;
   coupling a first acoustic signal to the handset originating the call;
   coupling a second acoustic signal to the handset terminating the call, the coupling of the second acoustic signal in synchronism with the coupling of the first acoustic signal;
   recording a sidetone and after a period of delay recording a third acoustic signal at the terminating handset for the call, the sidetone in response to the second acoustic signal and the third acoustic signal in response to the first acoustic signal; and
   measuring a one way transmission delay as the time difference between the start of the sidetone and the start of the third acoustic signal.

9. The method of claim 8 wherein the two handsets are both voice over Internet protocol (VoIP) handsets.

10. The method of claim 8 wherein the network is an Internet protocol (IP) network.

11. The method of claim 8 wherein the step of establishing the call comprises:
    locating the two handsets so that a delay measurement subsystem can be connected to both handsets.

12. The method of claim 8 wherein the step of coupling a first acoustic signal comprises:
    connecting the first delay measurement subsystem containing play capabilities to a transmitter of the handset originating the call;
    playing a first electrical pulse in the first delay measurement subsystem; and
    converting the first electrical pulse to the first acoustic signal.

13. The method of claim 12 wherein the step of coupling a second acoustic signal comprises:
    connecting the second delay measurement subsystem containing play capabilities to a transmitter of the handset terminating the call;
    playing a second electrical pulse in the second delay measurement subsystem, the second electrical pulse in synchronism with the first electrical pulse; and
    converting the second electrical pulse to the second acoustic signal.

14. The method of claim 8 wherein the step of recording comprises:
    connecting the delay measurement subsystem containing record capabilities to a receiver of the call termination handset; and
    converting the acoustic output of the call termination handset to electrical pulses that can be recorded and that represent the sidetone and first acoustic signal received over the network.

15. A method of determining the one way delay through an Internet protocol (IP) network between two devices, the method comprising:
    connecting a first subsystem with test signal play capabilities to a first device and to a second device, the second device having a connection path to the first device through an IP network, the connection path independent of the first subsystem;
    connecting a second subsystem with record capabilities to the second device;
    generating in the first subsystem a first test signal in the first device for transmission through the IP network;
    generating in the first subsystem a second test signal in the second device in synchronism with the first test signal;
    recording an output of the second device in the second subsystem to capture a sidetone from the second device in response to the second test signal and a third signal in response to the first test signal transmitted through the IP network from the first device; and
    calculating a difference between the presence of the sidetone and the presence of the third signal, wherein the difference represents the one way delay from the first device, through the IP network, to being received at the output of the second device.

16. The method of claim 15 wherein the first and the second devices are voice over Internet protocol (VoIP) handsets connected to a personal computer configured for VoIP communications.

17. The method of claim 15 wherein at least the first device or the second device is a headset device configured for communications over an IP network.

18. The method of claim 15 wherein the step of generating in the first subsystem a second test signal in the second device further comprises:
connecting with a cable the first test signal as the second test signal.

19. The method of claim 15 wherein the second test signal in the second device in synchronism with the first test signal has a minimum difference of time from the start of the first test signal to the start of the second test signal of less than or equal to one millisecond.

20. The method of claim 15 further comprising:
determining if the sidetone and the third test signal are two distinct pulses as recorded;
shortening the duration of the first test signal and the second test signal if there are not two distinct pulses recorded; and
returning to the step of generating in the first subsystem a first test signal.

* * * * *